O. K. HUGO.
SECTIONAL CONDUIT.
APPLICATION FILED JUNE 12, 1908.
950,264.
Patented Feb. 22, 1910.
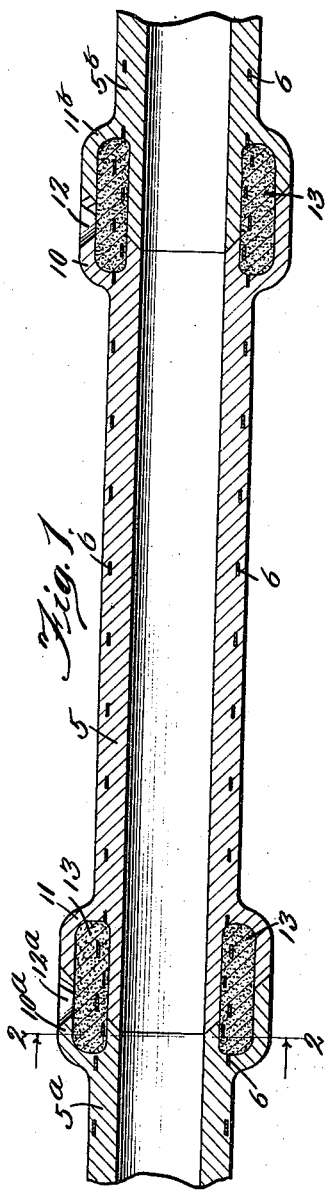
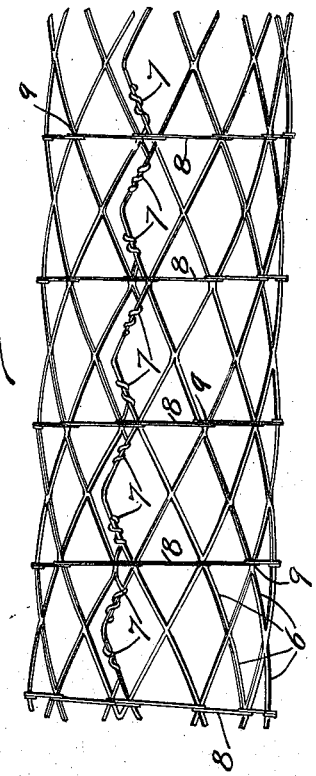
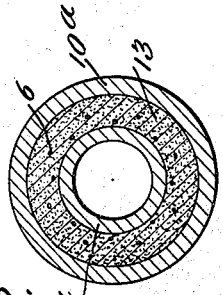
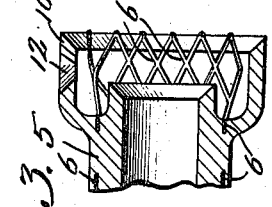

UNITED STATES PATENT OFFICE.

OLIVER K. HUGO, OF WHITEWATER, WISCONSIN.

SECTIONAL CONDUIT.

950,264.

Specification of Letters Patent. Patented Feb. 22, 1910.

Application filed June 12, 1908. Serial No. 438,162.

*To all whom it may concern:*

Be it known that I, OLIVER K. HUGO, a citizen of the United States, residing at Whitewater, in the county of Walworth and State of Wisconsin, have invented certain new and useful Improvements in Sectional Conduits, of which the following is a specification.

My invention relates to sectional conduits and has for its object to provide a sectional conduit or pipe which will be inexpensive to make, which will resist great pressure both from within and from without, and in which the sections may be conveniently and securely fastened together.

The invention has for a further object to provide a pipe or conduit section made out of cement or other non-metallic material with a suitable metal reinforcement, and to utilize said reinforcement for securing such section to the next adjoining sections in the conduit.

My invention has for further objects such other new and improved constructions in sectional conduits as will be described in the following specification and particularly specified in the claim appended thereto.

The invention may be applied to the construction of pipe or conduit sections to be used for sewers, drains, culverts, water mains or other conduits of any size, shape or material, or employed for any purpose.

The invention, in one illustrative embodiment, is shown in the accompanying drawings, wherein—

Figure 1 shows in longitudinal section a sectional conduit or pipe constructed in accordance with my invention. Fig. 2 is a cross section on line 2—2 of Fig. 1, looking in the direction of the arrows. Fig. 3 is a detail in longitudinal section of one end of one of the pipes before it is connected up with the next adjoining pipe; and Fig. 4 is a perspective view of one form of reinforcement.

Like characters of reference indicate like parts in the several figures of the drawings.

The conduit sections, made in accordance with the embodiment of my invention disclosed in Fig. 1, are composed of a body portion 5, preferably of non-metallic material, such as cement, for example; that is to say, my improved construction is of particular utility as an improvement upon the construction of pipe sections of this sort, although the same general arrangement might be employed, with some modifications, upon metal pipes. Within the body portion is embedded a metallic reinforcement consisting, as shown, of a sheet of expanded metal 6 bent around into cylindrical form, with its meeting edges fastened together in any desired manner, as, for example, by twisting the ends 7 of the strands at one edge around the strands of the other edge; and preferably also of transverse binding wires 8 which may loop around the expanded metal as indicated at 9. Preferably this reinforcement extends the whole length of the body portion and projects for some distance beyond the same at each end. The middle portion of the reinforcement, being simply for the purpose of strengthening the pipe section, might be omitted, if desired.

The pipe section at the ends is constructed with flanges 10 and 11, which constitute a sort of bell around the ends of the pipe. One of the flanges, for example flange 10, is perforated at 12. The ends of the pipe are preferably beveled and also the bells. Preferably also the flange 10 is made longer than the corresponding end of the pipe, while flange 11 is shorter. This gives a securer grip between the sections.

As stated, the reinforcement is made to extend beyond the cement body of the pipe section and these extending ends, which are preferably cut off at right angles, or thereabout, to the axis of the pipe, as shown in Fig. 3, will extend through and out of the recesses formed by the bells and preferably free from the ends of the pipe. The adjoining sections will, of course, be constructed in the same manner, that is, section $5^a$ will have a bell $10^a$ which will mate with bell 11 and which will be perforated at $12^a$. Section $5^b$ at the other end of section 5 will have a bell $11^b$ mating with the bell 10 of pipe section 5. There will thus be formed at each joint between the pipes an annular chamber 13, into which extend the projecting free ends of the metallic reinforcements. Preferably these reinforcements will extend far enough so as to overlap and to overlap beyond the line of junction between the sections. If desired, the reinforcements may be made to taper, so that the end of one will telescope with the end of the next within chamber 13. Cement or other solidifiable material is then poured or forced into the recesses 13. When this material is solidified around the ends of the reinforcements, the pipes will be securely fastened together and, moreover, a perfectly tight joint will be made.

The device described above might, of course, be very considerably modified without departure from the scope of my invention, but the arrangements and constructions, as I have described them, are, I believe, the most suitable for a cylindrical conduit of any ordinary dimensions. While it would not be necessary, perhaps, under all circumstances to run the reinforcement throughout the whole length of the pipe section, it being quite possible to embed a metal ring at each end of the pipe just far enough in the body to get a good anchorage, nevertheless the use of the metal reinforcement throughout the length of the pipe gives strength which could not be otherwise obtained, at least when the pipe section is made of cement, the material I prefer to use. The staggered construction of the pipes and bells at their ends obviously gives strength and rigidity, but this construction might not be necessary under all circumstances. I prefer to use for making my reinforcement ordinary expanded metal, because the reticulated structure of this material gives the reinforcement a good anchorage in the body of the pipe and also in the cement at the joint. Another form of reinforcement might be devised. I, therefore, do not limit myself to the particular devices, constructions and arrangements shown and described.

I claim:

A conduit section having at each end an enlarged portion provided with an annular groove in its face, the outer wall at one end of the section being provided with a filling opening; and securing devices embedded in the conduit sections and extending beyond each end of the section into the annular groove, whereby the sections may be placed end to end and united by forcing cement through the filling openings into the annular chamber formed by the end grooves to surround and grip the securing devices.

OLIVER K. HUGO.

Witnesses:
H. O. HAMILTON,
WM. LONGMATE.